United States Patent
Denis

(10) Patent No.: US 9,969,024 B2
(45) Date of Patent: May 15, 2018

(54) SYSTEMS AND METHODS FOR MEASURING CHARACTERISTICS OF A WELDING CABLE

(71) Applicant: ILLINOIS TOOL WORKS INC., Glenview, IL (US)

(72) Inventor: Marc Lee Denis, Lena, WI (US)

(73) Assignee: Illinois Tool Works Inc., Glenview, IL (US)

(*) Notice: Subject to any disclaimer, the term of this patent is extended or adjusted under 35 U.S.C. 154(b) by 639 days.

(21) Appl. No.: 14/575,671

(22) Filed: Dec. 18, 2014

(65) Prior Publication Data
US 2016/0175967 A1    Jun. 23, 2016

(51) Int. Cl.
| | |
|---|---|
| *B23K 9/10* | (2006.01) |
| *B23K 9/095* | (2006.01) |
| *H04B 3/10* | (2006.01) |
| *B23K 9/12* | (2006.01) |
| *H04B 3/54* | (2006.01) |
| *B23K 9/32* | (2006.01) |
| *H04B 3/466* | (2015.01) |
| *H04B 3/48* | (2015.01) |

(52) U.S. Cl.
CPC ........ *B23K 9/1043* (2013.01); *B23K 9/095* (2013.01); *B23K 9/0956* (2013.01); *B23K 9/1006* (2013.01); *B23K 9/1062* (2013.01); *B23K 9/124* (2013.01); *B23K 9/32* (2013.01); *H04B 3/10* (2013.01); *H04B 3/54* (2013.01); *H04B 3/466* (2013.01); *H04B 3/48* (2013.01)

(58) Field of Classification Search
CPC ........ B23K 9/08; B23K 9/095; B23K 9/0953; B23K 9/0956; B23K 9/1006; B23K 9/1062; B23K 9/1043; B23K 9/124; H04B 3/54; H04B 3/28; H04B 3/30; H04B 2203/5458
See application file for complete search history.

(56) References Cited

U.S. PATENT DOCUMENTS

| | | | |
|---|---|---|---|
| 2,043,331 | A | 6/1936 | Notvest |
| 2,175,891 | A | 10/1939 | Graham |
| 2,526,597 | A | 10/1950 | Winslow |

(Continued)

FOREIGN PATENT DOCUMENTS

| | | |
|---|---|---|
| EP | 0575082 | 12/1993 |
| EP | 1586403 | 10/2005 |

(Continued)

OTHER PUBLICATIONS

Echelon, "PL 3120 / PL 3150 Power Line Smart Transceiver Data Book," Version 2, 005-0154-01C.

(Continued)

*Primary Examiner* — Brian Jennison
(74) *Attorney, Agent, or Firm* — McAndrews, Held & Malloy, Ltd.

(57) ABSTRACT

A welding system having a welding power supply and a processor is provided. The welding power supply is configured to provide a welding power for a welding application through a weld cable. The processor is disposed within the welding power supply and the processor is configured to transmit and receive data related to a welding operating parameter through the weld cable. The processor is also configured to determine an equalization filter coefficient related to the weld cable.

24 Claims, 3 Drawing Sheets

(56) References Cited

U.S. PATENT DOCUMENTS

| | | |
|---|---|---|
| 2,617,913 A | 11/1952 | Oestreicher |
| 2,642,515 A | 6/1953 | Bagg |
| 3,496,328 A | 2/1970 | Moerke |
| 3,992,565 A | 11/1976 | Gatfield |
| 4,051,344 A | 9/1977 | Robbins |
| 4,079,231 A | 3/1978 | Toth |
| 4,147,919 A | 4/1979 | Matasovic |
| 4,216,367 A | 8/1980 | Risberg |
| 4,216,368 A | 8/1980 | Delay |
| 4,227,066 A | 10/1980 | Bulwidas |
| 4,247,752 A | 1/1981 | Stringer |
| 4,266,114 A | 5/1981 | Hansen |
| 4,410,789 A | 10/1983 | Story |
| 4,450,340 A | 5/1984 | Corrigall |
| 4,467,174 A | 8/1984 | Gilliland |
| 4,508,954 A | 4/1985 | Kroll |
| 4,521,672 A | 6/1985 | Fronius |
| 4,531,045 A | 7/1985 | Kemp |
| 4,561,059 A | 12/1985 | Davis |
| 4,584,685 A | 4/1986 | Gajjar |
| 4,608,482 A | 8/1986 | Cox |
| 4,641,292 A | 2/1987 | Tunnell |
| 4,767,908 A | 8/1988 | Dallavalle |
| 4,769,754 A | 9/1988 | Reynolds |
| 4,918,517 A | 4/1990 | Burgoon |
| 4,973,821 A | 11/1990 | Martin |
| 5,039,835 A | 8/1991 | Schwiete |
| 5,043,557 A | 8/1991 | Tabata |
| 5,063,282 A | 11/1991 | Gilliland |
| 5,276,305 A | 1/1994 | Hsien |
| 5,376,894 A | 12/1994 | Petranovich |
| 5,406,050 A | 4/1995 | Macomber |
| 5,653,902 A | 8/1997 | Chang |
| 5,834,916 A | 11/1998 | Shimogama |
| 5,982,253 A | 11/1999 | Perrin |
| 6,040,555 A | 3/2000 | Tiller |
| 6,091,048 A | 7/2000 | Lanouette |
| 6,103,994 A | 8/2000 | Decoster |
| 6,156,999 A | 12/2000 | Ignatchenko |
| 6,166,506 A | 12/2000 | Pratt |
| 6,225,596 B1 | 5/2001 | Chandler |
| 6,423,936 B1 | 7/2002 | Reed |
| 6,458,157 B1 | 10/2002 | Suaning |
| 6,479,791 B1 | 11/2002 | Kowaleski |
| 6,479,795 B1 | 11/2002 | Albrecht |
| 6,570,132 B1 | 5/2003 | Brunner |
| 6,624,388 B1 | 9/2003 | Blankenship |
| 6,627,849 B2 | 9/2003 | Ihde |
| 6,653,597 B2 | 11/2003 | Baum |
| 6,710,927 B2 | 3/2004 | Richards |
| 6,781,095 B2 | 8/2004 | Hayes |
| 6,818,860 B1 | 11/2004 | Stava |
| 6,906,285 B2 | 6/2005 | Zucker |
| 6,909,285 B2 | 6/2005 | Jordan |
| 7,049,547 B1 * | 5/2006 | Brunner ............... B23K 9/1062 219/130.5 |
| 7,205,503 B2 | 4/2007 | Reynolds |
| 8,345,819 B2 | 1/2013 | Mastronardi |
| 2001/0043656 A1 | 11/2001 | Koslar |
| 2003/0089693 A1 | 5/2003 | Hayes |
| 2004/0199846 A1 | 10/2004 | Matsumoto |
| 2005/0087523 A1 | 4/2005 | Zucker |
| 2006/0027546 A1 | 2/2006 | Reynolds |
| 2006/0076335 A1 | 4/2006 | Reynolds |
| 2006/0086706 A1 | 4/2006 | Ulrich |
| 2006/0138113 A1 | 6/2006 | Ott |
| 2007/0080154 A1 | 4/2007 | Ott |
| 2007/0114216 A1 | 5/2007 | Ott |
| 2009/0052281 A1 * | 2/2009 | Nybo .................. H04B 3/54 367/81 |
| 2011/0073569 A1 | 3/2011 | Rappl |
| 2011/0220619 A1 * | 9/2011 | Mehn .................. B23K 9/0953 219/108 |
| 2012/0076212 A1 * | 3/2012 | Zeppetelle ............... H04B 3/54 375/259 |
| 2014/0263256 A1 | 9/2014 | Rappl |
| 2015/0258621 A1 | 9/2015 | Ulrich |

FOREIGN PATENT DOCUMENTS

| | | |
|---|---|---|
| EP | 1748573 | 1/2007 |
| JP | 61137675 | 6/1986 |
| JP | 162966 | 6/1992 |
| JP | 04162964 | 6/1992 |
| JP | 4162964 | 6/1992 |
| JP | 04162966 | 6/1992 |
| JP | 05104248 | 2/1993 |
| JP | 2003088957 | 3/2003 |
| JP | 2003154455 | 5/2003 |
| JP | 2003191075 | 7/2003 |
| JP | 2003236663 | 8/2003 |
| WO | 2009149425 | 12/2009 |
| WO | 2011041037 | 4/2011 |
| WO | 2012058164 | 5/2012 |

OTHER PUBLICATIONS

Hackl et al., "Digitally Controlled GMA Power Sources," Fronius, www.fronius.com/worldwide/usa/products/paper_digitally_controlld_power_sources_gb.pdf, pp. 1-7, publication date not provided.

Intellon, "CEBus Power Line Encoding and Signaling," White Paper #0027, Mar. 1997, Version 0.1, pp. 1-6.

International Search Report from PCT application No. PCT/US2015/056127, dated Feb. 12, 2016, 13 pgs.

* cited by examiner

ND_024 B2

SYSTEMS AND METHODS FOR MEASURING CHARACTERISTICS OF A WELDING CABLE

BACKGROUND

The present disclosure relates generally to welding systems, and more particularly to systems and methods for weld cable communications.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A welding power source ensures that arc heating is available to melt the filler metal and the underlying base metal.

In certain applications, power cables supply power from the welding power source to a welding torch performing a welding application. For example, the welding power source may provide a welding voltage and current that may be utilized between the welding torch and a workpiece to perform the welding application. However, the arrangement and characteristics of power cables within the welding system may cause various distortions within the weld cable system that influences the welding process voltage and current. In some situations, a voltage sensor at the welding torch may be utilized to determine and/or correct the distorted welding voltage. In other situations, various interference variables of a welding system (e.g., inductance, resistance) may be determined to compensate for these distortions. However, measuring the welding voltage or determining the weld cable impedance during operation of the welding system may be a cumbersome and inefficient process. Accordingly, it may be beneficial to provide for systems and methods that efficiently and accurately compensate for these distortions within the weld cable system.

BRIEF DESCRIPTION

Certain embodiments commensurate in scope with the originally claimed present disclosure are summarized below. These embodiments are not intended to limit the scope of the claimed present disclosure, but rather these embodiments are intended only to provide a brief summary of possible forms of the present disclosure. Indeed, the present disclosure may encompass a variety of forms that may be similar to or different from the embodiments set forth below.

In one embodiment, a welding system having a welding power supply and a processor is provided. The welding power supply is configured to provide a welding power for a welding application through a weld cable. The processor is disposed within the welding power supply and the processor is configured to transmit and receive data related to a welding operating parameter through the weld cable. The processor is also configured to determine channel equalization filter coefficients related to the weld cable.

In another embodiment a method is provided. The method includes transmitting an initial modulated tone and an initial reference tone through a weld cable from a transmitter. The method also includes receiving a modulated tone and a reference tone through the weld cable at a receiver. The method also includes applying a digital filter function to the reference tone to determine one or more differences between a template for the reference tone and the received reference tone. The method also includes determining one or more channel equalization filter coefficients based on the differences between the template reference tone and the received reference tone, and compensating for a distortive characteristic of the weld cable based on the one or more channel equalization filter coefficients.

In another embodiment a welding system having a welding wire feeder and a processor is provided. The welding power supply is configured to configured to output wire for a welding application. The processor is disposed within the welding power supply and the processor is configured to transmit and receive data related to a welding operating parameter through a weld cable. The processor is also configured to determine channel equalization filter coefficients related to the weld cable.

DRAWINGS

These and other features, aspects, and advantages of the present disclosure will become better understood when the following detailed description is read with reference to the accompanying drawings in which like characters represent like parts throughout the drawings, wherein.

Figure 1:
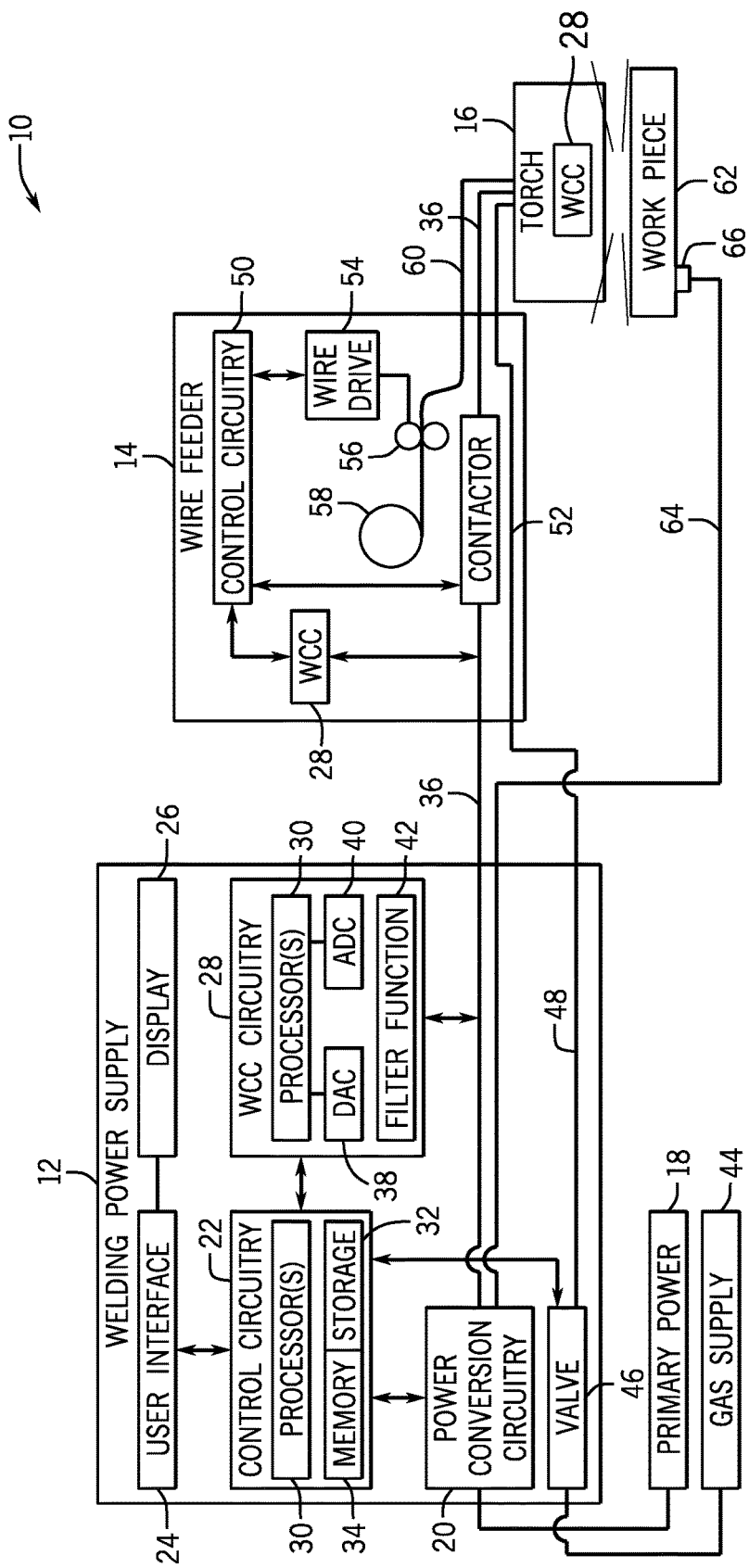
FIG. 1 is a block diagram of an embodiment of a welding system with a welding power supply having weld cable communications (WCC) circuitry, in accordance with aspects of the present disclosure.
Figure 2:
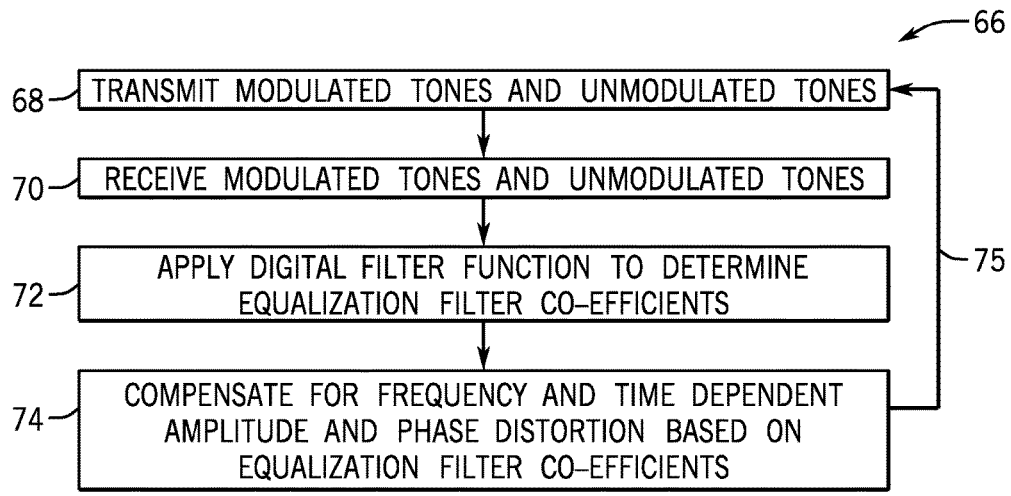
FIG. 2 is a flow diagram of an embodiment of a method for compensating for frequency and time dependent amplitude and phase distortions utilizing channel equalization filter coefficients, in accordance with aspects of the present disclosure.
Figure 3:
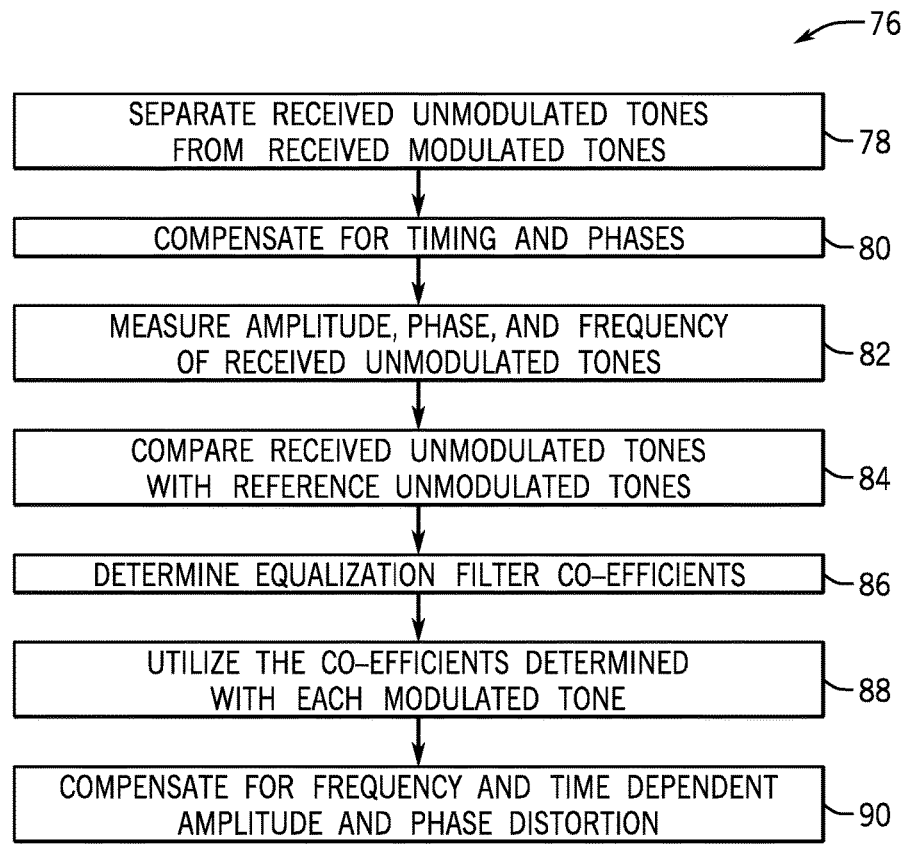
Figure 4:
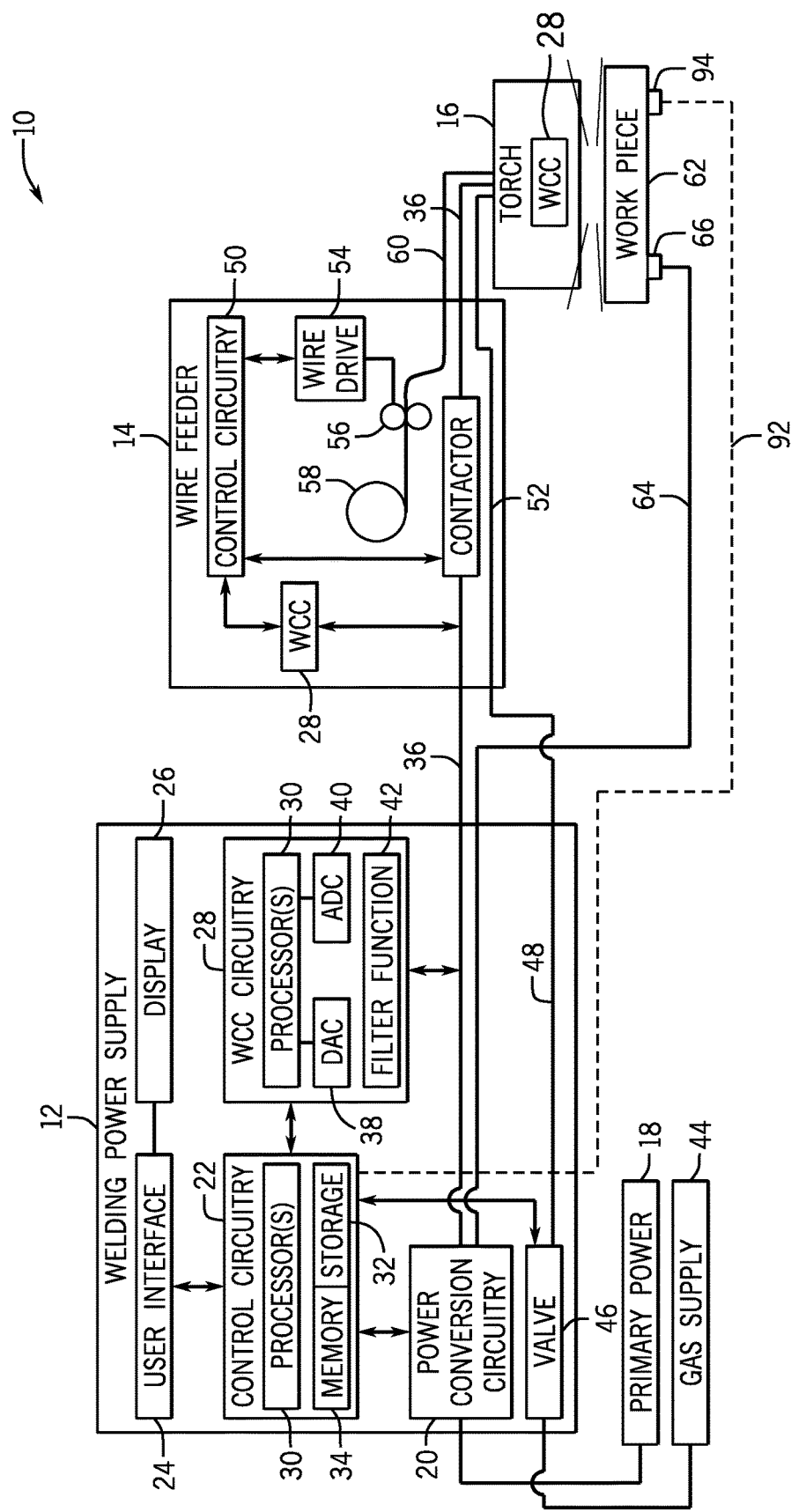

FIG. 3 is a flow diagram of an embodiment of a method for calculating the channel equalization filter coefficients of FIG. 2, in accordance with aspects of the present disclosure; and FIG. 4 is a block diagram of an embodiment of the welding system of FIG. 1, illustrating the welding power supply having the WCC circuitry and a voltage sense cable, in accordance with aspects of the present disclosure.

DETAILED DESCRIPTION

Turning now to the drawings, FIG. 1 is a block diagram of an embodiment of a welding system 10 having a welding power supply 12, a wire feeder 14, and a welding torch 16. The welding system 10 powers, controls, and supplies consumables to a welding application. In certain embodiments, the welding power source 12 directly supplies input power to the welding torch 16. The welding torch 16 may be a torch configured for stick welding, tungsten inert gas (TIG) welding, or gas metal arc welding (GMAW), based on the desired welding application. In the illustrated embodiment, the welding power source 12 is configured to supply power to the wire feeder 14, and the wire feeder 14 may be configured to route the input power to the welding torch 16. In addition to supplying an input power, the wire feeder 14 may supply a filler metal to a welding torch 14 for various welding applications (e.g., GMAW welding, flux core arc welding (FCAW)).

The welding power supply 12 receives primary power 18 (e.g., from the AC power grid, an engine/generator set, a battery, or other energy generating or storage devices, or a combination thereof), conditions the primary power, and provides an output power to one or more welding devices in accordance with demands of the system 10. The primary power 18 may be supplied from an offsite location (e.g., the primary power may originate from the power grid). Accordingly, the welding power supply 12 includes power conversion circuitry 20 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 20 may be configured to convert the primary power 18 to both weld and auxiliary power outputs. However, in other embodiments, the power conversion circuitry 20 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 22 to control the operation of the welding power supply 12. The welding power supply 12 also includes a user interface 24. The control circuitry 22 may receive input from the user interface 24 through which a user may choose a process and input desired parameters (e.g., voltages, currents, particular pulsed or non-pulsed welding regimes, and so forth). The user interface 24 may receive inputs using any input device, such as via a keypad, keyboard, buttons, touch screen, voice activation system, wireless device, etc. Furthermore, the control circuitry 22 may control operating parameters based on input by the user as well as based on other current operating parameters. Specifically, the user interface 24 may include a display 26 for presenting, showing, or indicating, information to an operator. The control circuitry 22 may also include interface circuitry for communicating data to other devices in the system 10, such as the wire feeder 14. For example, in some situations, the welding power supply 12 may wirelessly communicate with other welding devices within the welding system 10. Further, in some situations, the welding power supply 12 may communicate with other welding devices using a wired connection, such as by using a network interface controller (NIC) to communicate data via a network (e.g., ETHERNET, 10baseT, 10base100, etc.). In particular, the control circuitry 22 may communicate and interact with weld cable communications (WCC) circuitry 28, as further described in detail below.

The control circuitry 22 includes at least one controller or processor 30 that controls the operations of the welding power supply 12, and may be configured to receive and process multiple inputs regarding the performance and demands of the system 10. Furthermore, the processor 30 may include one or more microprocessors, such as one or more "general-purpose" microprocessors, one or more special-purpose microprocessors and/or ASICS, or some combination thereof. For example, in certain embodiments, the processor 30 may include one or more digital signal processors (DSPs).

The control circuitry 22 may include a storage device 32 and a memory device 34. The storage device 32 (e.g., nonvolatile storage) may include ROM, flash memory, a hard drive, or any other suitable optical, magnetic, or solid-state storage medium, or a combination thereof. The storage device 32 may store data (e.g., data corresponding to a welding application), instructions (e.g., software or firmware to perform welding processes), and any other suitable data. As may be appreciated, data that corresponds to a welding application may include an attitude (e.g., orientation) of a welding torch, a distance between the contact tip and a workpiece, a voltage, a current, welding device settings, and so forth.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor-executable instructions (e.g., firmware or software) for the processor 30 to execute. In addition, a variety of control regimes for various welding processes, along with associated settings and parameters, may be stored in the storage device 32 and/or memory device 34, along with code configured to provide a specific output (e.g., initiate wire feed, enable gas flow, capture welding current data, detect short circuit parameters, determine amount of spatter) during operation.

In certain embodiments, the welding power flows from the power conversion circuitry 20 through a weld cable 36 to the wire feeder 14 and the welding torch 16. Furthermore, in certain embodiments, welding data may be provided with the weld cable 36 such that welding power and weld data are provided and transmitted together over the weld cable system. In particular, the WCC circuitry 28 may be communicatively coupled to the weld cable 36 to communicate (e.g., send/receive) data over the weld cable 36. The WCC circuitry 28 may be implemented based on various types of power line communications methods and techniques. For example, the WCC circuitry 28 may utilize IEEE standard P1901.2 to provide data communications over the weld cable 36. In this manner, the weld cable 36 may be utilized to provide welding power from the welding power supply 12 to the wire feeder 14 and the welding torch 16. Furthermore, the weld cable 36 may also be utilized to transmit (and/or receive) data communications to the wire feeder 14 and the welding torch 16.

In certain embodiments, the WCC circuitry 28 includes one or more processors 30, a digital to analog convertor 38 (e.g. DAC 38, which may function as a transmitter), an analog to digital converter 40 (e.g., ADC 40, which may function as a receiver), and a filter function 42 (e.g., filter circuitry, digital filter function circuitry, filter function software executable by the one or more processors 30, or any combination thereof). In particular, the WCC circuitry 28 may be utilized to determine channel equalization filter coefficients representative of a distortive characteristic and/or a distortion related to a weld cable. Specifically, the distortive characteristic may be a frequency and time dependent amplitude and phase distortion (e.g., amplitude and/or phase distortion that is both frequency dependent and time dependent), as further described with respect to FIGS. 2-3. Further, the WCC circuitry 28 may be configured to utilize the channel equalization filter coefficients to compensate for the distortive characteristic of the weld cable. In certain embodiments, the WCC circuitry 28 may include one or more processors 30 separate from the processors 30 of the control circuitry 22. In certain embodiments, the WCC circuitry 28 may utilize the processors 30 of the control circuitry 22. In certain embodiments, the WCC circuitry 28 may be incorporated within, or may be coupled to, the control circuitry 22.

The DAC 38 may be coupled to the processor 30, and is configured to transmit data communications utilizing one or more carrier channels or "tones." Specifically, the one or more tones may be described as complex sinusoidal signals that are transmitted by the DAC 38. In certain embodiments, the DAC 38 may be disposed within the welding power supply 12, and the tones may be transmitted to one or more components of the welding system 10, such as to the welding torch 16 and/or the wire feeder 14. In other embodiments, the DAC 38 may be disposed within the welding torch 16, and the tones may be transmitted to the welding power supply 12 and/or the wire feeder 14. Likewise, in other embodiments, one or more components of the WCC circuitry 28 (e.g., the DAC 38, the ADC 40, or the filter function 42) may be disposed anywhere within the welding system 10, such as within the wire feeder 14 and/or the welding torch 16.

In certain embodiments, the DAC 38 may transmit modulated tones and/or unmodulated tones. Modulated tones may be utilized to communicate (e.g., send/receive) data using one or more known techniques for modulating a signal for data transmission. For example, the DAC 38 may utilize a hybrid amplitude and phase modulation scheme, such as Bi-Phase Shift Keying (BPSK), Quadrature Phase Shift Keying (QPSK), 16-ary Quadrature Amplitude Shift Keying (16-QAM) or similar variations. The modulated tones transmitted may include any type of information useful for the welding process or operation. For example, in some situations, the data transmitted by the WCC circuitry 28 may include information related to any welding parameter (e.g., weld voltage, wire speed) that is transmitted to the wire feeder 14 and/or the welding torch 16 for welding applications.

In some embodiments, the DAC 38 may also transmit unmodulated tones (also known as "pilot tones") that do not carry data. Specifically, unmodulated tones may be sinusoidal signals that have predefined or known characteristics, such as a predefined amplitude, frequency and phase. For example, for a given process, the DAC 38 may transmit unmodulated tones having the same amplitude but a different frequency, which may be an integral multiple of a lower reference frequency and a phase offset value. In particular, in certain embodiments, modulated tones may be distinguishable from unmodulated tones based on their assigned frequency, or their position within an OFDM frame. For example, the positional assignment of modulated versus unmodulated tones may be pre-assigned and this position may be known at the receiver (e.g., the ADC 40). Since the characteristics of the unmodulated tones are also known, unmodulated tones may be utilized as reference tones. In certain embodiments, a set of modulated tones with known characteristics may also be transmitted. For example, modulated tones with a known data modulation scheme, and a known (or pre-defined) data sequence may be transmitted in lieu of and/or along with the known unmodulated tones.

Accordingly, the data sequence may be of the form of cyclic prefix within the OFDM frame, for example, such that the last N symbols of an OFDM frame are appended to the beginning of the frame. At the receiver (e.g., the ADC 40), a circular convolution of the received frame may be performed and the results of that convolution may be used to compute the equivalent frequency and time dependent amplitude and phase distortion in the weld cable 36, and from that information a set of coefficients for a correcting channel equalization filter (e.g., an inverse function of the measured distortion) may be determined. Accordingly, in certain embodiments, either a known modulated or a known unmodulated tone may be utilized as a reference. In certain embodiments, the DAC 38 may transmit a plurality of tones, any number of which may be modulated or unmodulated. For example, out of 64 tones transmitted by the DAC 38, 48 of the tones may be modulated tones utilized for data transmission and 16 tones may be unmodulated tones utilized as reference tones (without any data modulation). It should be noted that the DAC 38 may be configured to transmit any number of modulated tones and unmodulated tones.

In certain embodiments, an Orthogonal Frequency Division Multiplexing (OFDM) scheme may be utilized by the DAC 38 to transmit the modulated and unmodulated tones on multiple carrier frequencies (e.g., frequency-division multiplexing). For example, within the OFDM scheme, the DAC 38 may be configured to transmit the one or more tones over several parallel data stream or channels at a low modulation rate, thereby maintaining transmission characteristics that are similar to a single-carrier modulation scheme. In particular, the frequency-division multiplexing scheme may divide a single transmission medium having a particular total bandwidth into a series of non-overlapping frequency sub-bands that are each configured to carry a particular signal. In this manner, the single transmission medium (e.g., the weld cable 36) may be shared by multiple separate unmodulated or modulated tones.

In certain embodiments, the ADC 40 of the WCC circuitry 28 may be configured to receive the several transmitted modulated and unmodulated tones, as described with respect to FIGS. 2-3. Further, the filter function 42 may be configured to process and analyze the received modulated and unmodulated tones to characterize the weld cable 36. More specifically, the filter function 42 of the WCC circuitry 28 may be configured to apply a digital filter function that is configured to compare the unmodulated tones transmitted by the DAC 38 with the unmodulated tones received by the ADC 40. In particular, based on the differences (if any) between the transmitted unmodulated signals and received unmodulated signals, the filter function 42 may be configured to determine one or more coefficients (e.g., values, polynomials, etc.). In certain embodiments, the one or more coefficients may correspond to distortion characteristics of the weld cable 36. Furthermore, the filter function 42 may be configured to utilize the determined coefficients to compensate for possible frequency and time dependent amplitude and phase distortion in the weld cable 36, as further described with respect to FIGS. 2-3. In certain embodiments, the WCC circuitry 28 is configured to communicate with the control circuitry 22, which may be configured to adjust a welding voltage provided to the welding torch 16 (and/or to the wire feeder 14) based on information received from the filter function 42.

Further, in certain embodiments, the storage device 32 or the memory device 34 may be configured to store data related to the WCC circuitry 28, such as characteristics (e.g., a phase, an amplitude, a frequency) of each unmodulated tone transmitted or received by the WCC circuitry 28, information related to the frequency of each tone transmitted or received by the WCC circuitry 28, the number and/or grouping of the unmodulated or modulated tones, the one or more determined frequency and time dependent amplitude and phase distortions in the weld cable 36, the location of the DAC 38 and/or the ADC 40, the channel equalization filter coefficients calculated or determined by the WCC circuitry 28, a current, previous, actual, or corrected welding operating parameter (e.g., welding voltage, wire speed), and any other information related to the WCC circuitry 28. In addition, in certain embodiments, the storage device 32 or the memory device 34 may be configured to store one or more templates of unmodulated (e.g., reference) or modulated tones that have known characteristics. For example, the one or more templates may include 16 unmodulated tones each having a known amplitude, a known frequency, and a known phase shift. When one or more unmodulated tones are received by the WCC circuitry 28, the WCC circuitry 28 may be configured to compare the received modulated or unmodulated tones with a corresponding template.

A gas supply 44 provides shielding gases, such as argon, helium, carbon dioxide, and so forth, depending upon the welding application. The shielding gas flows to a valve 46, which controls the flow of gas, and if desired, may be selected to allow for modulating or regulating the amount of gas supplied to a welding application. The valve 46 may be opened, closed, or otherwise operated by the control circuitry 22 to enable, inhibit, or control gas flow (e.g., shielding gas) through the valve 46. Shielding gas exits the valve 46 and flows through a cable 48 (which in some implementations may be packaged with the welding power output) to the wire feeder 14 which provides the shielding gas to the welding application. As may be appreciated, certain embodiments of the welding system 10 may not include the gas supply 44, the valve 46, and/or the cable 48.

In certain embodiments, the wire feeder 14 may use the welding power to power the various components in the wire feeder 14, such as to power control circuitry 50. As noted above, the weld cable 36 may be configured to provide or supply the welding power. The welding power supply 12 may also communicate with the wire feeder 14 using the cable 36 and the WCC circuitry 28 disposed within the welding power supply 12. In certain embodiments, the wire feeder 14 may include the WCC circuitry 28, which is substantially similar to the WCC circuitry 28 of the welding power supply 12. Indeed, the WCC circuitry 28 of the wire feeder 14 may cooperate with the control circuitry 50 of the wire feeder 14 in similar ways as the welding power supply 12 cooperates with the control circuitry 22. The control circuitry 50 controls the operations of the wire feeder 14. In certain embodiments, the wire feeder 14 may use the control circuitry 50 to detect whether the wire feeder 14 is in communication with the welding power supply 12 and to detect a current welding process of the welding power supply 12 if the wire feeder 14 is in communication with the welding power supply 12.

A contactor 52 (e.g., high amperage relay) is controlled by the control circuitry 50 and configured to enable or inhibit welding power to continue to flow to the weld cable 36 for the welding application. In certain embodiments, the contactor 52 may be an electromechanical device, while in other embodiments the contactor 52 may be any other suitable device, such as a solid state device. The wire feeder 14 includes a wire drive 54 that receives control signals from the control circuit 50 to drive rollers 56 that rotate to pull wire off a spool 58 of wire. The wire is provided to the welding application through a wire cable 60. Likewise, the wire feeder 14 may provide the shielding gas through the cable 48. As may be appreciated, in certain embodiments, the cables 36, 48, and 60 may be bundled together or individually provided to the welding torch 16.

The welding torch 16 delivers the wire, welding power, and shielding gas for a welding application. The welding torch 16 is used to establish a welding arc between the welding torch 16 and a workpiece 62. In certain embodiments, the weld torch 16 may include the WCC circuitry 28, which is substantially similar to the WCC circuitry 28 of the welding power supply 12. Indeed, the WCC circuitry 28 of the weld torch 16 may interact in similar ways as the welding power supply 12 cooperates with the control circuitry 22. A work cable 64, which may be terminated with a clamp 66 (or another power connecting device), couples the welding power supply 12 to the workpiece 62 to complete a welding power circuit.

FIG. 2 is a flow diagram of an embodiment of a method 66 for correcting a distortive characteristic of the weld cable 36 in the weld system 10, in accordance with aspects of the present disclosure. Specifically, the distortive characteristic may be a frequency and time dependent amplitude and phase distortion of the weld cable 36. The distortive characteristic may be determined by determining one or more channel equalization filter coefficients. Further, the WCC circuitry 28 may compensate for the distortive characteristic by utilizing the determined channel equalization filter coefficients.

As noted above with respect to FIG. 1, the WCC circuitry 28 of the welding power supply 12 may be configured to characterize the parameters or properties of the weld cable 36 with one or more channel equalization filter coefficients. Specifically, the one or more channel equalization filter coefficients may be values that are representative of various characteristics of the weld cable 36. For example, the channel equalization filter coefficients may be representative of a distortive characteristic of the weld cable 36. In other words, the channel equalization filter coefficients may be representative of frequency and time dependent amplitude and phase distortions of the weld cable 36. In this manner, the systems and methods described herein allow for the characterization of the weld cable 36, and obviate the need for taking actual measurements to characterize the weld cable 36, as further described in detail below. Further, the one or more channel equalization filter coefficients may be utilized to compensate for frequency and time dependent amplitude and phase distortion within the weld cable 36 that may influence the power or data being transmitted. For example, certain embodiments address situations in which the welding voltage provided by the welding power supply 12 would be substantially different than the welding voltage received by the welding torch 16 due to frequency and time dependent amplitude and phase distortion in the weld cable 36 if not mitigated. Accordingly, the WCC circuitry 28 may be configured to determine one or more channel equalization filter coefficients that may be representative of distortion characteristics of the weld cable 36. Further, the WCC circuitry 28 may be configured to utilize the one or more channel equalization filter coefficients that are determined to compensate for any frequency and time dependent amplitude and phase distortion within the weld cable 36, as further described below.

The method 66 begins with the WCC circuitry 28 transmitting modulated tones and unmodulated tones (block 68) from the welding power supply 12 and/or the wire feeder 14. Specifically, the DAC 38 of the WCC circuitry 28 (of either the welding power supply 12 or the wire feeder 14) may be configured to transmit the modulated and unmodulated tones. As noted above, modulated tones may include information related to the welding process or operation, such as information related to an operating parameter (e.g., weld voltage, wire speed, etc.) of the welding system 10 or related to an adjusted operating parameter of the welding system 10. In particular, unmodulated tones (e.g., pilot tones) transmitted by the DAC 38 may not carry any information related to the welding process or operation. Instead, unmodulated tones may be sinusoidal reference signals that have predefined or known characteristics, such as a predefined amplitude, frequency, and/or phase. For example, in certain embodiments, all of the unmodulated tones transmitted may have the same frequency and amplitude. In certain embodiments, the modulated tones transmitted may also have known characteristics that allow the modulated tones to be utilized as the reference tones. Furthermore, in certain embodiments, the unmodulated tones may each be transmitted at a known phase. For example, each of the unmodulated tones transmitted may be equally spaced in tone frequency, such that each succeeding tone increments its phase reference to the first tone by 90 degrees. For example, if a first unmodulated tone is at a reference of 0 degrees of phase, a second unmodulated tone may be at 90 degrees phase, a third unmodulated tone may be at 180 degrees phase, and so forth. It should be noted that the unmodulated tones may be configured at any alternate unmodulated tone configuration, so long as the frequency, amplitude and phase configurations are known and substantially constant. For example, in certain embodiments, the phase of each unmodulated tone need not be equally spaced, so long as the phase is known.

The method 66 further includes the WCC circuitry 28 receiving the transmitted modulated and unmodulated tones at the ADC 40 (block 70). In certain embodiments, the WCC circuitry 28 may transmit the modulated tones and unmodulated tones to the welding torch 16 and may receive the transmitted tones from the welding torch 16. In such situations, the WCC circuitry 28 may be configured to account or compensate for the distortion of the weld cable 36 twice and/or in two directions (e.g., a first distortion from the WCC circuitry 28 to the welding torch 16 and a second distortion from the welding torch 16 to the WCC circuitry 28). In other embodiments, the welding torch 16 may include a DAC 38 that is configured to transmit the modulated and unmodulated tones. In such situations, the WCC circuitry 28 may be configured to account or compensate or the distortion of the weld cable 36 once and/or in one direction. In either situation, the ADC 40 may be configured to receive the modulated and unmodulated tones, and may also be configured to receive the original location from which the tones were transmitted.

The ADC 40 may provide the received tones (e.g., modulated and unmodulated) to the filter function 42 for further processing. Further, in certain embodiments, the method 66 includes applying a digital filter function to the received modulated and unmodulated tones with the filter function 42 (block 72). As noted above, the digital filter function may be utilized to compare the transmitted unmodulated tones with the received unmodulated tones. As noted above, the transmitted unmodulated tones are transmitted with a known amplitude, frequency, and phase. Accordingly, in certain embodiments, the transmitted unmodulated tones may be utilized as reference tones and compared with the received unmodulated tones within the filter function 42 to determine one or more differences, such as differences in phase, amplitude, or frequency. Based on the differences between the transmitted and received unmodulated tones, the filter function 42 may be configured to determine one or more channel equalization filter coefficients. Specifically, the channel equalization filter coefficients may be representative of the distortive characteristics of the weld cable 36, as further described with respect to FIG. 3.

Further, the method 66 includes compensating for the frequency and time dependent amplitude and phase distortion (e.g., distortive characteristic of the weld cable 36) utilizing the channel equalization filter coefficients (block 74). In certain embodiments, the WCC circuitry 28 may be configured to adjust one or more welding parameters based on the one or more determined coefficients and based on the characteristics of the weld cable 36. For example, in certain situations, the WCC circuitry 28 may increase or decrease a welding voltage provided by the welding power supply 12 to the wire feeder 14 and/or the welding torch 16 based on the calculated channel equalization filter coefficients. As a further example, the WCC circuitry 28 may be configured to increase or decrease a wire speed provided by the wire feeder 14 based on the calculated channel equalization filter coefficients. In some embodiments, the WCC circuitry 28 provides this information to the control circuitry 22, so that the control circuitry 22 may make the proper adjustments to the welding parameters and/or provide the information to other components of the welding system 10. In short, the WCC circuitry 28 may be configured to provide to the welding system 10 the determined and/or calculated distortive characteristics and/or coefficients of the weld cable 36. Accordingly, the calculated or determined distortive characteristics and/or coefficients may be provided by the control circuitry 22 as actual feedback to other components of the welding system 10.

In particular, the method 66 may be utilized as a continuous feedback loop 75 that allows for the correction of power and data transmitted via the weld cable 36 in subsequent times based on the information calculated and determined. In this manner, the WCC circuitry 28 may be configured to regulate and correct for any frequency and time dependent amplitude and phase distortion in the weld cable 36 in a dynamic process during the operation of the welding torch 16. Accordingly, more accurate welding operating parameters may be utilized during the welding process. For example, with the continuous feedback loop 75, the WCC circuitry 28 may dynamically adjust the welding voltage provided to the welding torch 16 and workpiece 62 during the welding process.

FIG. 3 is a flow diagram of an embodiment of a method 76 for calculating the one or more channel equalization filter coefficients of FIG. 2, in accordance with aspects of the present disclosure. As noted above, the filter function 42 of the WCC circuitry 28 may be configured to apply a digital filter function to the modulated and unmodulated tones received by the ADC 40 and transmitted by the DAC 38. In particular, the filter function 42 may be configured to calculate or determine one or more channel equalization filter coefficients based on the modulated and unmodulated tones received by the ADC 40, as further described below.

In certain embodiments, the method 76 begins with separating the unmodulated tones from the modulated tones received by the ADC 40 (block 78). For example, in certain embodiments, the ADC 40 may receive 64 tones, of which 48 tones are modulated tones utilized for data transmission and 16 tones are unmodulated tones. Accordingly, the unmodulated tones may be separated from the modulated tones by the filter function 42 for further processing to determine the one or more coefficients.

In certain embodiments, the method further includes compensating for timing and phasing of the unmodulated tones (block 80). For example, in some situations, there may be one or more clocking variations between the DAC 38 and the ADC 40. Accordingly, the filter function 42 may be configured to compensate for the frequency error between the DAC 38 and the ADC 40 with one or more frequency and/or phase control loops. In particular, the ADC 40 may be configured to associate each transmitted tone with a corresponding received tone. For example, 16 unmodulated tones may be transmitted by the DAC 38 with a known amplitude, a known frequency, and at a known phase shift. Accordingly, each of the 16 transmitted unmodulated tones may correspond to each of the 16 received unmodulated tones. In certain embodiments, compensating for frequency and phase may include associating the transmitted tone with its corresponding received tone. In certain embodiments, the method 76 may be configured to compensate and correct for the frequency variations between the DAC 38 and the ADC 40 before separating the modulated tones from the unmodulated tones.

Furthermore, the method 76 may include measuring the characteristics (e.g., phase, amplitude and/or frequency) of the received unmodulated tones. Accordingly, in certain embodiments, the filter function 42 may be configured to measure the actual amplitude, and the actual phase of the received unmodulated tones (block 82). As noted above, the transmitted unmodulated tones may be transmitted with a known frequency, a known amplitude, and a known phase and may thus be utilized as a reference tone. Accordingly, once the actual characteristics of the received unmodulated tones are determined, the method 76 may include comparing the characteristics of the received unmodulated tones with the characteristics of the transmitted (reference) unmodulated tones (block 84). Comparing the received unmodulated tones and the transmitted (reference) unmodulated tones may be done in any suitable manner.

For example, in certain embodiments, the received unmodulated tones are multiplied by the complex conjugate of the original transmitted (reference) unmodulated tones. The expected result of a vector multiplied by its complex conjugate is a vector with an amplitude and no imaginary part. In this case, the expected answer would be "1+j0." The error vector resulting from the multiplication of the complex conjugate of the received unmodulated tones and the original transmitted (reference) tones is utilized to perform an interpolation. The interpolation populates missing members of the set of tones, at each indexed frequency, with a phasor with an interpolated amplitude and an interpolated phase. In certain embodiments, however, the actual result of a vector multiplied by its complex conjugate indicates an amplitude and phase distortion for each tone. For example, the actual answer is a series of vectors, each with amplitude and phase, for each pilot tone frequency. Accordingly, if 16 unmodulated tones received are received for an OFDM Symbol Length of 64, the actual result of the digital filter function process may be a 3×64 matrix with frequency, amplitude, and phase as column vectors and each of the 64 values assuming a row position. The 16 measured error vectors populate the positions in the 3×64 matrix assigned to the reference tones and the 48 'missing' tones, assigned to the data tones, are populated with interpolated values. The resulting 3×64 matrix is then used as the data to calculate the channel equalization filter and also the inverse of the channel equalization filter. Other reference tone versus data tone configurations, FFT lengths and OFDM symbol configurations are possible.

The filter function 42 may be configured to utilize the differences determined between the received unmodulated tones and the transmitted (reference) unmodulated tones to determine the channel equalization filter coefficients (block 86). As noted above, the channel equalization filter coefficients define a Finite Impulse Response (FIR) or Infinite Impulse Response (IIR) filter with a length that is determined by the number of tones used in the OFDM system, otherwise specified as the symbols in an OFDM frame, excluding any cyclic prefix, and which filter provides an inverse function to the frequency dependent amplitude and phase distortion of the weld cable 36. As further information, the inverse of the channel equalization filter is the analytic description of the two port transfer function of the weld cable as a transmission line. For example, the inverse of the channel equalization filter coefficients may be transformed, using a mathematical algorithm, to describe any characteristic or physical property of the weld cable 36 that may have an effect on the power or data transmitted by the weld cable 36. The transfer function (inverse channel equalization filter) may be representative of a length of the weld cable 36, a resistance, an inductance, and so forth. However, it should be noted that the inverse channel equalization filter (transfer function) is not the characteristic itself, but are merely an abstract representation of the characteristics as defined in a sampled time reference system.

In certain embodiments, the method 76 further includes utilizing the channel equalization filter coefficients determined from the unmodulated tones pre-distort each of the modulated and unmodulated tones that will be transmitted by the DAC 38 in the next iteration of the function (block 88). For example, the unmodulated tones may be multiplied with the modulated tones by the channel equalization (FIR) filter to correct for the frequency and time dependent amplitude and phase distortion of the weld cable 36 (e.g., distortive characteristic of the weld cable 36). Accordingly, in this manner, it may be beneficial to utilize the channel equalization filter coefficients to compensate for frequency and time dependent amplitude and phase distortion in the weld cable system (block 90).

In certain embodiments, the method 76 calculates the channel equalization filter and its inverse function. The inverse function of the channel equalization filter provides the equivalent two port transfer function of the weld cable and can be used as an element in the feedback loop within the welding power supply 12 control system, effectively replacing the voltage sense cable 92.

FIG. 4 is a block diagram of an embodiment of the welding system 10 of FIG. 1, illustrating the welding power supply 12 having the WCC circuitry 28 and a voltage sense cable 92, in accordance with aspects of the present disclosure. In certain embodiments, a voltage sense cable 92 is coupled from the control circuitry 22 of the welding power supply 12 to the workpiece 62 using a sense clamp 94 (or another power connecting mechanism). In other embodiments, the voltage sense cable 92 may also be coupled to the wire feeder 14.

In certain embodiments, the voltage sense cable 92 may be configured to determine the actual welding voltage between the welding torch 16 and the workpiece 62. Specifically, the voltage sense cable 92 may be configured to provide the actual welding voltage to the control circuitry 22 of the welding power supply 12 during operation of the welding system 10. In certain embodiments, the information received from the WCC circuitry 28 regarding compensating and/or correcting for the frequency and time dependent amplitude and phase distortion in the weld cable 36 may be compared to the actual weld voltage measurements provided by the voltage sense cable 92. Accordingly, the control circuitry 22 may monitor the accuracy of the digital filter function and the accuracy of the frequency and time dependent amplitude and phase distortion in the weld cable 36 based on the comparison of the actual welding voltage with the estimated and compensated frequency and time dependent amplitude and phase distortion in the weld cable 36.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
   a welding power supply configured to provide welding power for a welding application through a weld cable; and
   a processor disposed within the welding power supply, wherein the processor is configured to transmit and receive data related to a welding operating parameter through the weld cable, to transmit one or more modulated or unmodulated tones through the weld cable, to determine an equalization filter coefficient related to the weld cable based on the one or more modulated or unmodulated tones, and to use the equalization filter coefficient to compensate for a distortive characteristic of the weld cable.

2. The welding system of claim 1, wherein the distortive characteristic is a frequency and time dependent amplitude and phase distortion of the weld cable.

3. The welding system of claim 1, comprising a welding torch coupled to the welding power supply and configured to receive the welding power and the data related to the welding operating parameter through the weld cable.

4. The welding system of claim 1, wherein a transmitted modulated tone is a complex signal utilized by the processor to send or receive data related to the welding operating parameter.

5. The welding system of claim 1, wherein the processor uses a sequence of modulated tones as a reference signal.

6. The welding system of claim 1, wherein a transmitted unmodulated tone is a sinusoidal signal comprising a reference amplitude, a reference phase, and a reference frequency, and wherein the transmitted unmodulated tone is utilized by the processor as a reference signal.

7. The welding system of claim 1, wherein the processor is coupled to a receiver configured to receive the one or more transmitted modulated or unmodulated tones through the weld cable.

8. The welding system of claim 7, wherein the processor is configured to apply a digital filter to the one or more modulated or unmodulated tones, and wherein the digital filter is configured to determine the equalization filter coefficient related to the weld cable.

9. The welding system of claim 8, wherein a received unmodulated tone comprises a received amplitude, a received frequency, and a received phase, and wherein the digital filter is configured to compare the received amplitude, the received frequency, and the received phase to a reference amplitude, a reference frequency, and a reference phase to determine the equalization filter coefficient related to the weld cable.

10. The welding system of claim 1, wherein a transmitted modulated tone is a complex signal utilized by the processor to send or receive data related to the welding operating parameter, and wherein a transmitted unmodulated tone, utilized by the processor as a reference signal, comprises a reference amplitude, a reference phase, a reference frequency, a reference modulation scheme, or a combination thereof.

11. A method, comprising:
    transmitting an initial modulated tone and an initial reference tone through a weld cable from a transmitter;
    receiving a modulated tone and a reference tone through the weld cable at a receiver;
    applying a digital filter function to the reference tone to determine one or more differences between a template for the initial reference tone and the reference tone;
    determining one or more channel equalization filter coefficients based on the differences between the template for the initial reference tone and the reference tone; and
    compensating for a distortive characteristic of the weld cable based on the one or more channel equalization filter coefficients.

12. The method of claim 11, wherein the transmitter, the receiver, and a processor configured to perform the digital filter function are disposed within a welding power supply.

13. The method of claim 11, wherein the transmitter, the receiver, and a processor configured to perform the digital filter function are disposed within a welding wire feeder.

14. The method of claim 11, comprising:
    transmitting the initial modulated tone and the initial reference tone through the weld cable to a welding torch; and
    receiving the modulated tone and the reference tone through the weld cable from the welding torch.

15. The method of claim 11, wherein the reference tone is an unmodulated tone.

16. The method of claim 11, wherein applying the digital filter function comprises measuring an actual amplitude, an actual phase, or an actual frequency of the reference tone.

17. The method of claim 16, wherein applying the digital filter function comprises comparing the actual amplitude, the actual phase, and the actual frequency of the reference tone to a reference amplitude, a reference phase, and a reference frequency of the initial reference tone to determine the one or more differences.

18. A welding system, comprising:
    a welding wire feeder configured to output welding wire for a welding application; and
    a processor disposed within the welding wire feeder, wherein the processor is configured to transmit and receive data related to a welding operating parameter through a weld cable, to transmit one or more modulated or unmodulated tones through the weld cable, to determine an equalization filter coefficient related to the weld cable based on the one or more modulated or unmodulated tones, and to use the equalization filter coefficient to compensate for a distortive characteristic of the weld cable.

19. The welding system of claim 18, wherein the distortive characteristic is a frequency and time dependent amplitude and phase distortion of the weld cable.

20. The welding system of claim 18, comprising a welding torch coupled to the welding wire feeder and configured to receive the welding wire and the data related to the welding operating parameter through the weld cable.

21. The welding system of claim 18, wherein the processor is coupled to a transmitter configured to transmit a reference unmodulated tone, wherein the reference unmodulated tone comprises a reference amplitude, a reference phase, a reference frequency, or a combination thereof.

22. The welding system of claim 21, wherein the processor is coupled to a receiver configured to receive a received unmodulated tone, wherein the received unmodulated tone comprises a received amplitude, a received phase, a received frequency, or a combination thereof.

23. The welding system of claim 22, wherein the processor is configured to apply a filter function configured to compare the reference unmodulated tone with the received unmodulated tone to determine one or more differences in an amplitude, a phase, a frequency, or a combination thereof.

24. The welding system of claim 23, wherein the filter function is configured to determine one or more channel equalization filter coefficients based on the one or more differences.

* * * * *